US005580148A

United States Patent [19]
Liao

[11] Patent Number: 5,580,148
[45] Date of Patent: Dec. 3, 1996

[54] AUTOMATICALLY SLAVED MOTOR VEHICLE LIGHT

[76] Inventor: Yu-Ken Liao, Suite 1, 11F, 95-8 Chang Ping Rd. Sec. 1, Taichung, Taiwan, Taiwan

[21] Appl. No.: 436,151

[22] Filed: May 8, 1995

[51] Int. Cl.$^6$ ........................................ B60Q 1/24
[52] U.S. Cl. ................ 362/35; 362/37; 362/71; 362/74; 362/66; 362/423; 362/40
[58] Field of Search ........................ 362/71, 35, 37, 362/40, 66, 74, 69, 233, 271, 269, 272, 275, 287, 419, 420, 422, 423, 424, 427, 428; 74/42, 53, 54

[56] References Cited

U.S. PATENT DOCUMENTS

| | | | |
|---|---|---|---|
| 1,491,377 | 4/1924 | Calhoun | 362/422 |
| 4,204,270 | 5/1980 | Poirier d'Ange d'Orsay | 362/71 |
| 4,353,110 | 10/1982 | Ellis | 362/233 X |
| 4,722,030 | 1/1988 | Bowden | 362/423 X |
| 4,833,573 | 5/1989 | Miyauchi et al. | 362/71 |
| 4,890,207 | 12/1989 | Jones | 362/233 |
| 4,930,057 | 5/1990 | Williams | 362/272 |
| 4,973,155 | 11/1990 | Masuda | 362/71 |
| 5,099,400 | 3/1992 | Lee | 362/71 X |
| 5,404,278 | 4/1995 | Shibata et al. | 362/37 X |

*Primary Examiner*—Denise L. Gromada
*Assistant Examiner*—Thomas M. Sember

[57] ABSTRACT

An automatically slaved light for a motor vehicle comprises a roof mounted lamp steerable about a horizontal and vertical axis, and an internal control unit within the coach of the vehicle. The control unit rotates the lamp unit about the vertical axis via a first motor in the lamp housing when the vehicle is engaging a turn, wherein the lamp is rotated in the direction of turn of the vehicle to an angle proportional to the steering angle thereof as determined by a steering angle sensor coupled to the vehicle's steering wheel. The lamp is rotated upward about the horizontal axis by the control unit via a second motor in the lamp housing when the vehicle is traversing a declinate section of road, wherein the lamp unit is rotated upward relative the longitudinal axis of the motor vehicle to an angle proportional to the angle defined between the longitudinal axis of the vehicle and the gravitational horizon which is determined by a level sensor in the control unit.

1 Claim, 4 Drawing Sheets

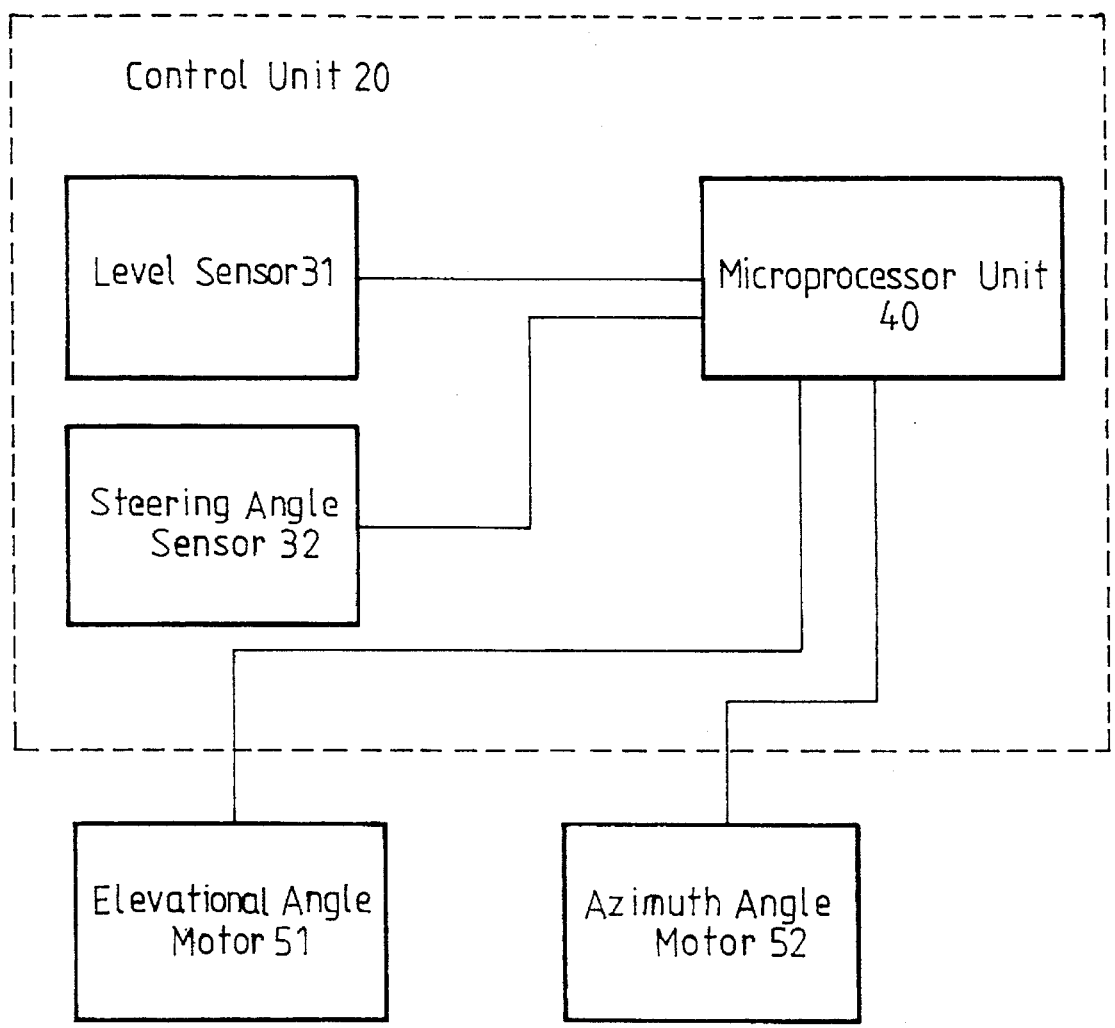
F I G 1

AUTOMATICALLY SLAVED MOTOR VEHICLE LIGHT

BACKGROUND OF THE PRESENT INVENTION

The present invention relates to an automatically slaved lamp for a motor vehicle, and more particularly to an automatically slaved lamp which is externally mounted on a vehicle roof and which rotates in the direction of turn of the vehicle and which rotates upwards when the vehicle is traversing a downslope.

The prior art teaches the lateral pivoting of a vehicle's head lamps for more efficient illumination of a traversed path when engaging a curved track of road, while others also teach the pivoting elevation of a vehicle head lamps when traversing a downslope so as to better illuminate the straight road at the bottom of the slope. However, to the best knowledge of the instant inventor, no prior art teaches the combined pivoting of a lamp unit about both vertical and horizontal axes when a host vehicle is traversing a crowed path or a downward slope, respectively, for more efficient and timely illumination of the anticipated path, and which employs an independent lamp trait and housing which is mounted on the roof of the vehicle under the control of a control unit installed within the vehicle's coach.

SUMMARY OF THE PRESENT INVENTION

The automatically slaved vehicle light of the present invention comprises a roof mounted lamp unit rotatably supported about horizontal and vertical axis in a lamp housing, and an internal control unit mounted within the vehicle's cabin. The microprocessor based control unit includes a steering angle sensor coupled to the vehicle's steering wheel for sensing the direction and angle of turn of the vehicle, and a level sensor which determines the declination angle of the vehicle when traversing a downward slope. As a function of the inputs from the steering angle sensor and level sensor, the microprocessor transmits control signals to motors disposed within the lamp housing which rotate the lamp about the vertical and horizontal axes to a degree proportionate to the angular displacements registered by the respective sensors.

The present invention has as a main objective to provide an automatically slaved vehicle light as characterized which increases passenger safety by better illuminating curved road sections so as to provide ample warning of approaching objects thereon, and similarly to provide ample warning of approaching objects on a relatively level road section at the bottom of a declinate path of approach.

A further object of the present invention is to provide an automatically slaved vehicle light as characterized which can be easily installed or retrofitted into conventional motor vehicles.

A more thorough understanding of the present invention will be attained by reference to a detailed description of a preferred embodiment thereof provided below along with accompanying drawings.

BRIEF DESCRIPTION OF THE DRAWINGS

FIG. 1 is a schematic block diagram of the slaved light of the present invention.

DETAILED DESCRIPTION OF THE PREFERRED EMBODIMENT

Figure 4:
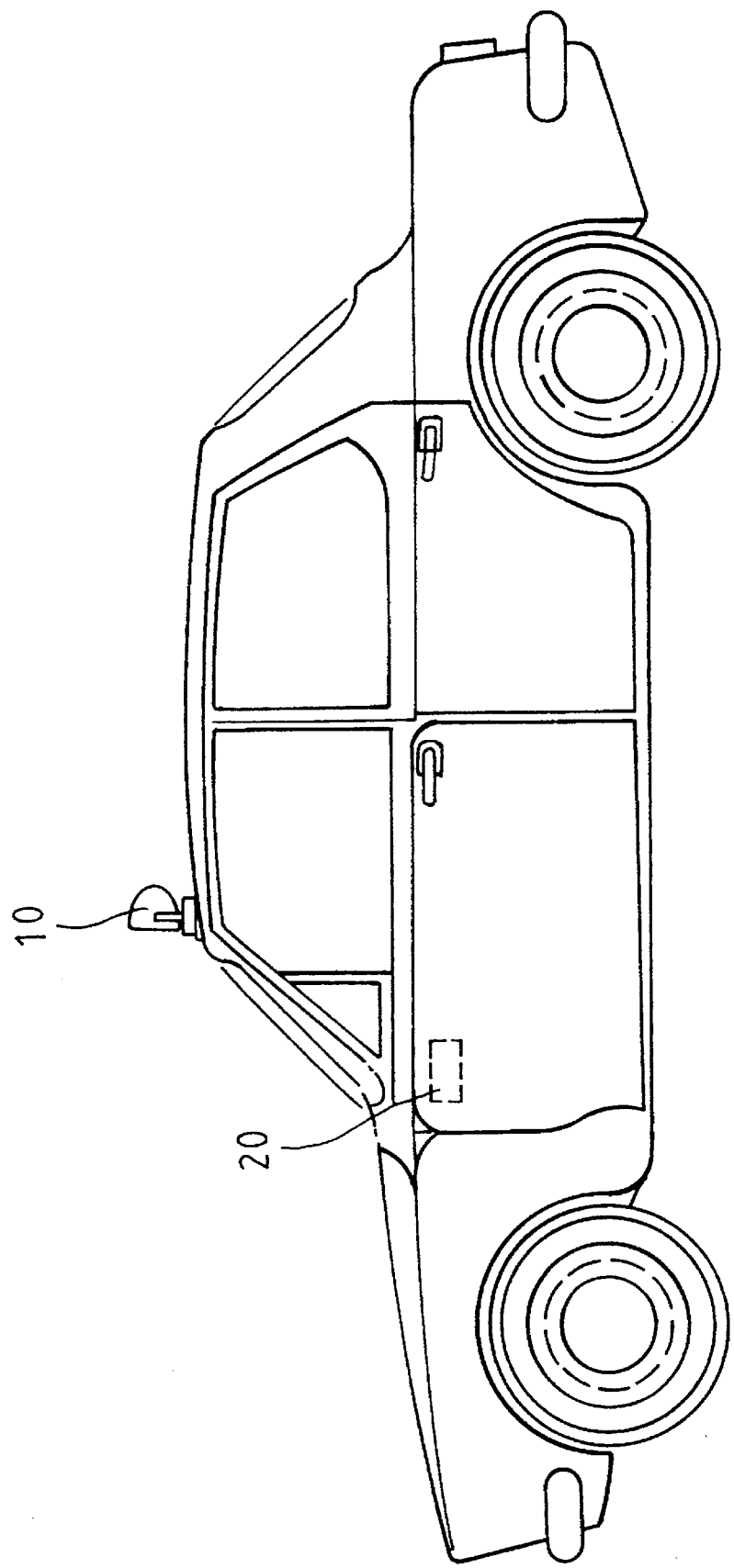
FIG. 4 shows the steerable light assembly mounted on the roof of a motor vehicle.

The automatically slaved light of the present invention comprises a steerable light housing 10 mounted on the roof of a motor vehicle, as shown in FIG. 4, and a control unit 20 internally mounted within the vehicle for determining the direction of illumination of the light housing. Referring to FIG. 1, the control unit comprises a level sensor 31, a steering angle sensor 32, and a microprocessor unit 40 which controls actuator motors within the light housing 10 via interface circuits 41. The level sensor 31 senses the angle of the longitudinal axis of the motor vehicle above or below the gravitational horizon, and provides this information to the microprocessor 40 in signal communication therewith. Similarly, the steering angle sensor 32 senses the angle of steer of the motor vehicle as determined by the angular orientation of the steering wheel within the vehicle's cabin which is engaged therewith, and communicates this information to the microprocessor. The microprocessor 40 controls step motors 51,52 in communication with the outputs thereof via the interface circuits 41 as a function of the inputs from the level sensor and steering angle sensor.

Figure 2:
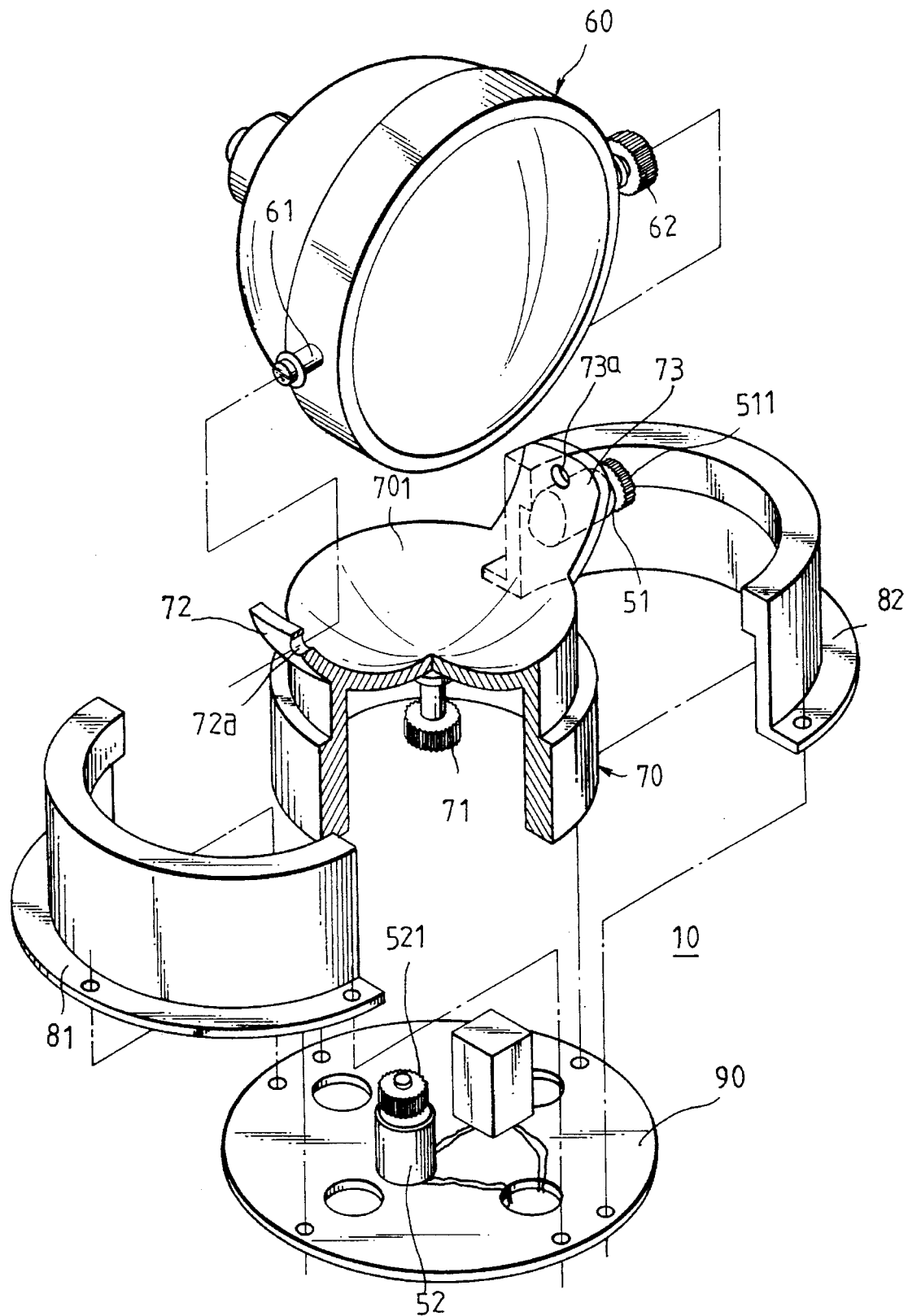
FIG. 2 is a perspective exploded view of a steerable light housing.
Figure 3:
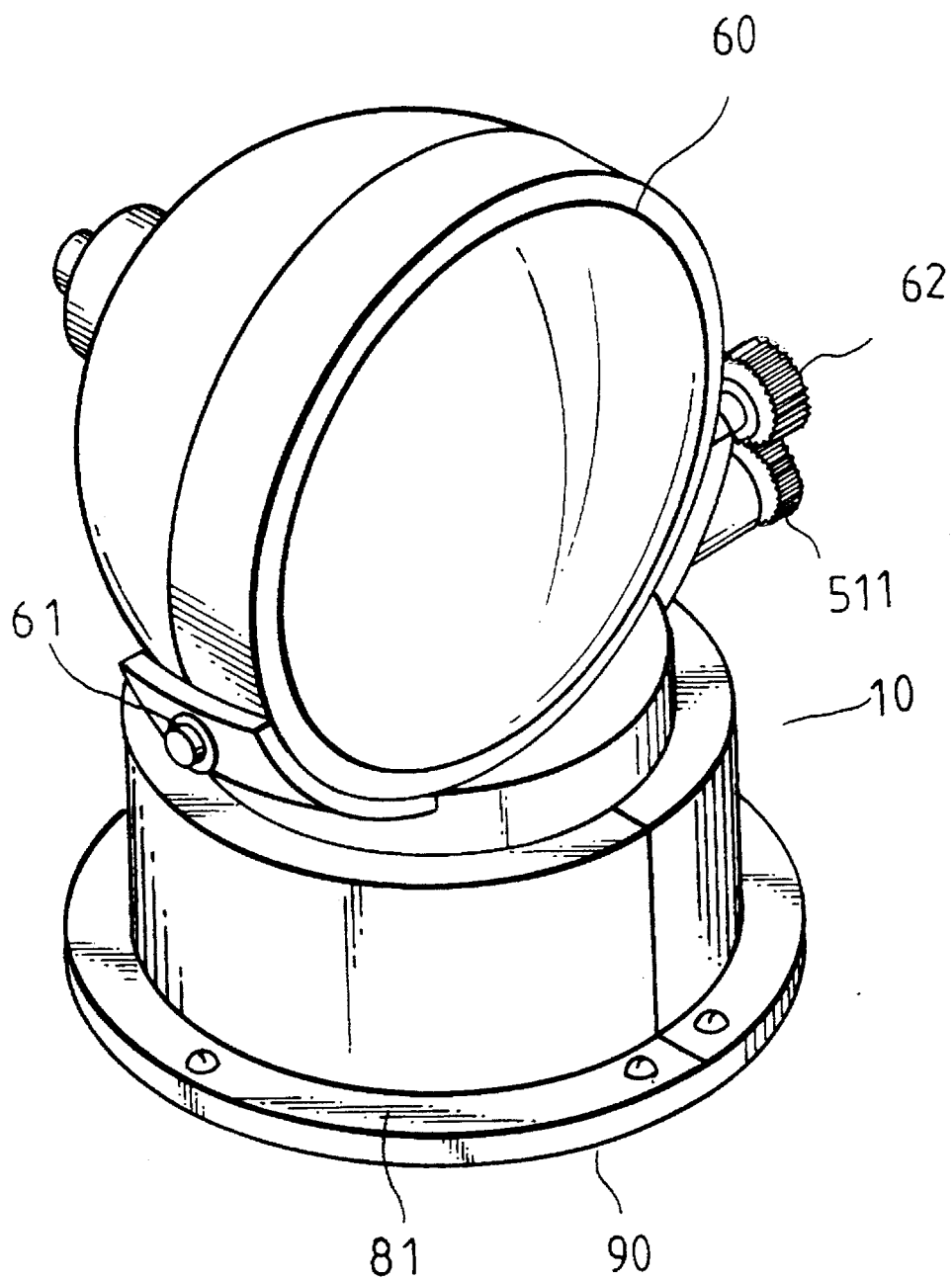
FIG. 3 is a perspective assembled view of the assembly of FIG. 2.

Referring to FIGS. 2 and 3, the vehicle roof mounted light housing 10 comprises a lamp unit 60 pivotably mounted on a gimbal 70, a pair of C shaped flanges 81.82 between which the gimbal is rotatingly secured, and a circular base plate 90 to which the flanges are fixedly secured. The lamp unit has an axle projection 61 on one side thereof which is disposed through a hole 72a on a first ear 72 of the gimbal. A gear 62 is fixed on a diametrically opposed projection opposite axle 61 which is disposed within a hole 73a on a second ear 73 of the gimbal to pivotably secure the lamp unit thereon. Gear 62 is engaged with a gear 511 coupled to the shall of motor 51 fixed to the exterior of the second ear of the gimbal. 70. The lamp unit can be rotated about a horizontal axis on the gimbal by step motor 51 thereby enabling control of the elevational angle of the lamp unit. Gimbal 70 is rotatingly secured between the symmetrical flanges 81,82 which are fixed to base plate 90 via threaded fasteners (not shown) engaged through through holes on the outer peripheries thereof; which also extend through the roof of the motor vehicle to secure the steerable light assembly thereon. A gear 71 depends frown the center of the roughly cup shaped gimbal below the bowl 701 thereof over which the lamp unit is mounted. Gear 71 is engaged with a gear 521 coupled to the shaft of motor 52 fixed on the base plate 90. The lamp unit is rotated about a vertical axis on the gimbal by step motor 52 so as to control the azimuth angle thereof In operation, the microprocessor 40 effects the rotation of lamp unit 60 about a vertical azimuth axis via motor 52 wherein the lamp unit is rotated in the direction of turn of the motor vehicle to an angle proportional to the steering angle thereof as determined by input from sensor 32. In this manner the illumination from the lamp unit is directed along the actual path of travel of the vehicle when traversing a curved road section, whereat in comparison the illumination frown conventional head lamps would be generally directed tangentially to the curved path. The rotation of the lamp unit 60 about the horizontal elevational angle is similarly controlled by microprocessor 40 via motor 51 wherein the lamp is rotated upward when the motor vehicle is descending an inclinate section of road. The lamp unit is rotated upward to an angle which is proportional to the downward elevational angle between the longitudinal axis of the vehicle and the gravitational horizon.

In comparison with the illumination of conventional head lamps of a motor vehicle, the steerable lamp of the present invention would rotate about the vertical axis when the vehicle is negotiating a curve so as to direct the light from the lamp onto the curved road section ahead and better illuminate the path, whereas the light from the conventional headlights would be directed generally tangent to the crowed path and provide a less optimal illumination. Similarly, the upward rotation of the steerable lamp when the vehicle is traveling down a slope provides better illumination of the stretch of level road at the bottom of the descent whereas conventional head lamps would direct illumination largely at the straight path where it immediately adjoins the descent.

The modular lamp assembly can be readily and inexpensively mounted on a vehicle roof using mechanical fasteners and the control cables for the stepper motors can be internally routed to the controller within the cabin of the vehicle by a mechanic of average skill. The controller can either be mounted in or on the vehicle's dashboard wherein a signal cable therefrom leads to the steering angle sensor which is also readily coupled to the steering column by a skilled mechanic. The steerable lamp assembly of the present invention can thus be readily retrofitted onto an existing conventional vehicle and does not need re-design or modified manufacturing of a motor vehicle.

The scope of the present invention should not be construed to be limited to the specificities of the above disclosure. Many modifications and variations could be accomplished by a person of average skill in the art, and as such the actual breadth of the present invention should be determined from the appended claim.

I claim:

1. An automatically slaved light comprising:

a base member mounted on a roof of a motor vehicle in a substantially horizontal orientation with respect therewith;

a gimbal member rotatingly secured on said base member about a substantially vertical axis;

a lamp member rotatingly mounted on said gimbal member about a substantially horizontal axis;

an azimuth motor rotatingly coupled to said gimbal member for rotating said gimbal member about the vertical axis;

an elevation motor rotatingly coupled to said lamp member for rotating said lamp member about the horizontal axis;

a steering angle sensing means coupled to a steering column of said motor vehicle for sensing a steering angle thereof;

a level sensing means for sensing an elevational angle of said motor vehicle;

a controller means for receiving respective signals from said steering angle sensing means and said level sensing means in communication therewith, and for transmitting control signals to respective said azimuth motor and said elevation motor in communication therewith, said controller means effecting a rotation of said gimbal member via control signals to said azimuth motor in a direction of a turn of said motor vehicle to a degree proportional to a angle of turn thereof as determined by a signal from said steering angle sensing means, and a upward rotation of said lamp member via control signals to said elevation motor upon a downward direction of travel of said motor vehicle to a degree proportional to a downward elevational angle thereof as determined by a signal from said level sensing means.

* * * * *